July 24, 1962  AKIRA YAMAMOTO ETAL  3,045,557
METHOD OF CUTTING COOPERATING WORMS AND WORM WHEELS
Filed Dec. 1, 1958  2 Sheets-Sheet 1

INVENTORS
AKIRA YAMAMOTO
AKIRA TOYAMA
BY Woodhams Blanchard & Flynn
ATTORNEYS

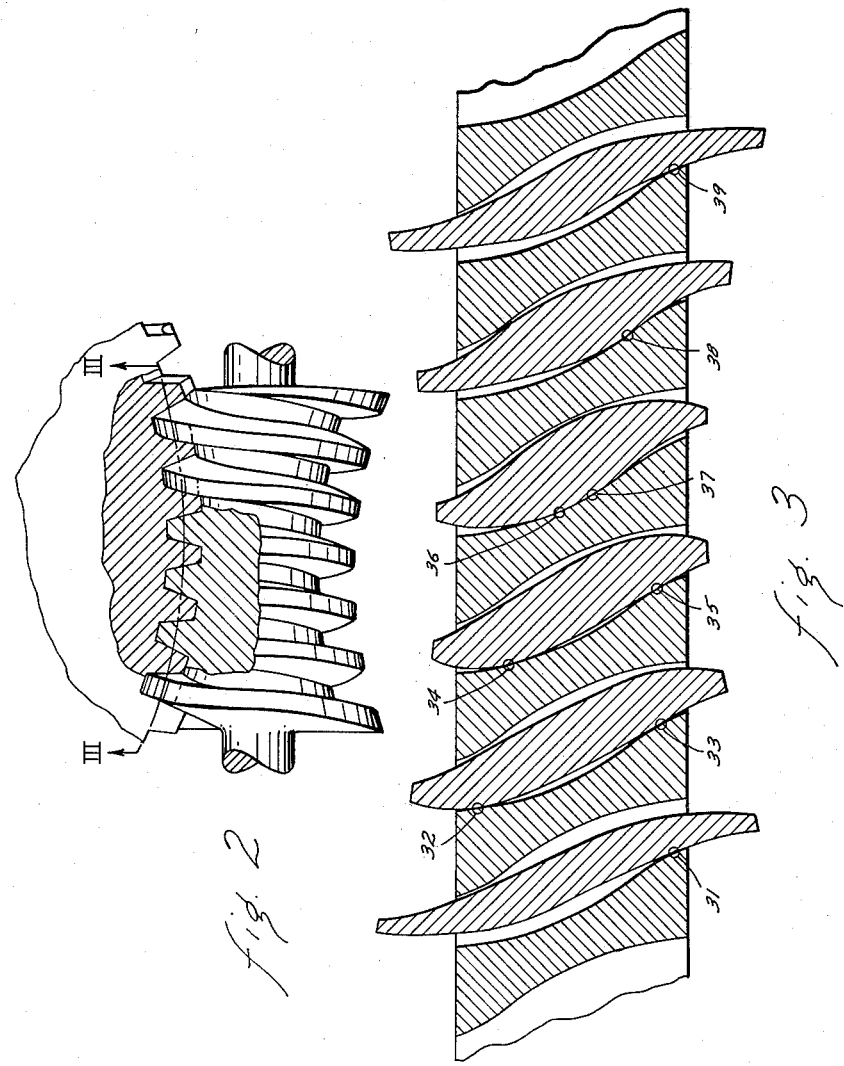

United States Patent Office 3,045,557
Patented July 24, 1962

3,045,557
METHOD OF CUTTING COOPERATING WORMS AND WORM WHEELS
Akira Yamamoto, Tokyo, and Akira Toyama, Kawasaki, Japan
Filed Dec. 1, 1958, Ser. No. 777,347
4 Claims. (Cl. 90—4)

This invention relates to a worm and worm wheel construction of the hourglass or Hindley type and to the method for making the worm and the worm wheel herein involved, and this invention particularly relates to the structure, and method of making, an hourglass shaped worm and a suitable worm wheel for cooperation therewith. This application is a continuation-in-part of our copending application Serial No. 571,175, filed March 13, 1956, and now abandoned.

The use with a worm wheel of an hourglass shaped worm has been known for many years and it has advantages for many uses in that the worm contacts with substantially equal pressure a number of teeth on the worm wheel and, therefore, a given amount of power can be transmitted from the worm to the worm wheel, or vice versa, with a much smaller loading for each tooth on the worm wheel and for each flight of the worm. This, as is well known, results in permitting the use of much smaller worms and worm wheels for a given condition of load transmission than is required where an equivalent load is transmitted through a straight worm and cooperating worm wheel, there is correspondingly less wear on the parts, lubrication is easier and numerous other similar and related advantages are available and are well known to the industry.

A great amount of work has been done previously with respect to the design and construction of Hindley type worms and worm wheels, particularly as exemplified by the United States patents to Cone, No. 1,751,540, 1,683,-163, 1,822,800, 1,885,696 and others, and as set forth in detail in "Analytical Mechanics of Gears," E. Buckingham, McGraw-Hill Book Co., Inc. 1949. However, in spite of all this previous work, there has still remained a number of problems which have previous to this invention not been successfully solved insofar as we are aware, namely:

(a) in the normal method of cutting a worm wheel with a conventional rotating cutter, or hob, the simultaneous rotation of both the hob and the worm wheel blank has usually resulted in the presence of a small but definite ridge appearing in the middle of each tooth of the worm wheel. This ridge provides an area at which the pressure between the worm flight and a worm wheel tooth is concentrated and hence tends to maximize in this area the wear between the parts and to minimize the effect of lubrication. A major portion of the power transmitted between the worm wheel and the worm is transmitted through the ridge on one side or the other of the edge thereof and this limits the power transmitting capacity of the worm and worm wheel arrangement;

(b) even though a worm wheel which is free from said ridges can be manufactured by special methods, said ridges will soon be formed on the tooth surface of it during the normal use of the wheel cooperating with a conventional hourglass worm.

It therefore becomes highly desirable to design a worm which will not form the above mentioned ridge in its normal course of operation with a worm wheel, to provide a simple and economical method of manufacturing such a worm and to provide a method of manufacturing a worm wheel wherein the above mentioned ridge will not appear.

Accordingly, the objects of the invention are:

(1) to provide a worm of generally hourglass shape which will wear the teeth of the cooperating worm wheel evenly and not tend to form a central ridge thereon;

(2) to provide a worm, as aforesaid, which is sufficiently similar to presently known hourglass worms that it can be used in the place of present hourglass worms without change in design, nature or character of use in any appreciable manner and to provide a worm wheel for effectively cooperating with said worm;

(3) to provide a method of making such an hourglass worm, and cooperating worm wheel, which is simple and effective and can be carried out economically;

(4) to provide a method of making such an hourglass worm, and cooperating worm wheel, which is sufficiently similar to present methods of making hourglass worms and worm wheels that it can be carried out by machinery of generally familiar nature and can be carried out by any workman generally acquainted with present methods;

(5) to provide a method of making a worm wheel which will not produce, as an incident of the worm wheel making steps, the above mentioned ridge, but rather will provide a wheel having teeth of desired shape which are free from any ridge or other undesired irregularity;

(6) to provide an hourglass worm and worm wheel construction wherein a single tooth as it travels from one end of the worm to the other will receive driving pressure thereon at different contacting lines across the pressure receiving face of such tooth, and wherein each of the other teeth of the worm wheel are similarly treated;

(7) to provide an hourglass shaped worm wherein the lead of the flights thereon varies slightly from one end to the other of said worm;

(8) to provide a worm for cooperating with a worm wheel wherein the lead varies in one direction progressively from a point near the center of the worm to one end of said worm and said lead varies progressively in the other direction from said point of the worm to the other end of the worm.

Other objects and purposes of the invention will be apparent to persons acquainted with devices of this general type upon a reading of the following specification and inspection of the accompanying drawings.

In the drawings:

FIGURE 2 is a view, partially in central section, of the worm and worm wheel.

FIGURE 3 is a sectional view of a worm and worm wheel substantially as taken along the line III—III of FIGURE 2.

GENERAL DESCRIPTION

In general, the invention comprises modifying the lead in the thread of an otherwise conventional hourglass worm so that in one half of the worm the lead varies in one direction from a chosen norm such as being slightly less than such norm, and in the other half of the worm the lead varies slightly in the other direction from said norm, such as being slightly greater than said norm. This, when used with a worm wheel made in accordance with the present invention, will contact each successive tooth of the worm wheel as it moves from one end of the worm to the other at different lines on the face of the tooth and thereby spread the wear substantially evenly across the face of the tooth, and thereby avoid the formation of the ridge above mentioned.

The worm is conventionally made by moving a suitable metal removing device through a predetermined pattern with respect to the worm blank and the process of the invention utilizes this basic operation. The metal removing device may be of many types, particularly including cutting tools or grinding wheels, but for convenience in description and with no intent to limit, it will hereinafter be assumed to be a cutting tool.

The worm is advantageously made by applying a controlling motion to the otherwise conventional motion of the cutting tool with respect to the worm blank so that the cutting tool at one half of the worm tends to vary from its normal position, such as leading slightly ahead of it, as it moves from one end to said point near the center of the worm and said tool will tend to be moved slightly in the opposite direction from its normal cutting line, such as lagging slightly behind it, as it moves from said point near the center of the worm wheel to the opposite end. The worm wheel is then advantageously made by forming a hob in the same manner as is herein provided for the forming of the worm itself and utilizing such hob for the cutting of the worm wheel. The hob, similarly to the threads of the worm, in the cutting operation contacts the teeth being cut at different points across the respective faces of each thereof and thereby provides a smooth surface for each of said teeth rather than resulting in a ridge as in present practice.

*Detailed Description*

Figure 1:
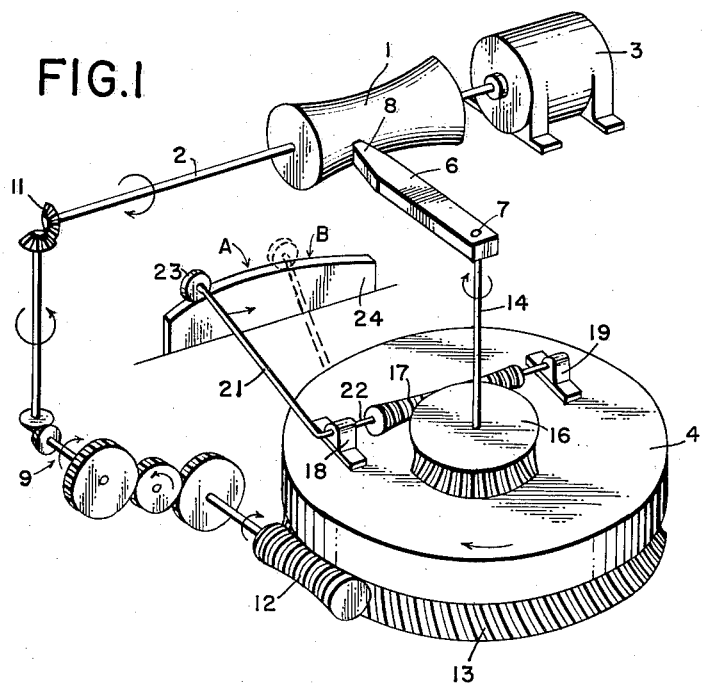
FIGURE 1 is schematic view of apparatus suitable for forming an hourglass worm according to this invention and for forming a hob suitable for shaping a worm wheel for use with such a worm.

The invention may be best explained, both from the standpoint of the construction of the worm and from the standpoint of the method of manufacturing same, by a description first of the means and method by which a worm embodying the invention is formed. Accordingly, there is schematically shown in FIGURE 1 a mechanism adapted for the manufacture of a worm according to the invention. Nothing beyond a schematic showing of FIGURE 1 is presented inasmuch as the details of mechanism are conventional, are already known to the art, and are fully explained in the above mentioned Cone patents. Further, inasmuch as the invention resides more in the organization of the apparatus and control of a cutting tool than it does in the details of any particular machine construction, it is believed that the invention will be more clearly illustrated by merely a schematic showing of the mechanism required.

Referring now to FIGURE 1 there is shown a worm blank 1 mounted for rotation on a shaft 2 and driven by a source of rotative power 3 which may be a motor and gear box combination. A rotatable table 4 is mounted on a fixed base and supports a post 14 which is coaxial with the table 4. A tool 6 is supported on post 14 and a point 7 on said tool lies in the extended axis of said post. The tool 6 is provided with a cutting tip 8 in contact with the blank 1 for cutting worm threads thereon. Suitable mechanical elements, such as those comprising the gear train indicated generally at 9, and including a gear 11 mounted on the shaft 2, are provided for providing a positive mechanical connection between the gear 11 and a worm 12. Worm 12 is in mesh with worm wheel teeth 13, which latter teeth 13 are affixed for rotation with the table 4.

Thus far, and assuming that the tool 6 turns angularly about its point 7 in fixed relationship with the table 4, the mechanism described is conventional and will be well understood by those acquainted with equipment of this general type.

However, in practicing the invention, the post 14 supporting the tool 6 is mounted fixedly with respect to a worm wheel 16 which worm wheel is coaxial with the table 4 but is rotatably related thereto. A worm 17 is engaged with the teeth of the worm wheel 16, is supported on shaft 22 and said shaft is in turn mounted on the table 4 by the bearings 18 and 19. Any convenient cam following device, such as an arm 21 extending radially from the shaft 22, is provided for supporting a cam follower 23. A cam 24 is provided in fixed relationship with the base upon which the table 4 is mounted. Said cam is in this embodiment of substantially arcuate shape generated on a relatively large radius. Said cam 24 is related to the rest of the apparatus and particularly to the table 4, worm 17, worm wheel 16 and tool 6, so that when the cam follower 23 is at the leftward (as appearing in FIGURE 1) end of said cam and the tool 8 is at the leftward (as appearing in FIGURE 1) end of the worm blank 1, said cam follower will move progressively with the tool 6 in a rightward direction during the cutting of a worm until said cam follower 23 reaches the rightward end of the cam 24 at substantially the same time the tool 6 reaches the rightward end of the worm blank 1. Said cam 24 is provided with a progressively diminishing upslope in its leftward portion, here its leftward half "A," and it is provided with a progressively increasing downslope in its rightward portion, here the half "B."

*Operation of Worm Forming Mechanism*

The operation of the worm forming mechanism will be apparent from the foregoing description of its construction, but will be reviewed for purposes of effecting a complete disclosure.

Rotative power originating in the source 3 is applied to the worm blank 1, causing it to rotate slowly in the same manner as in convention practice. Simultaneously, such rotation is conducted to the gear 11 and thence through the gear train 9 to the worm 12 where it is applied to the worm wheel 13 and thereby effects rotation of the table 4. The ratio of rotation between the blank 1 and the table 4 is such that if the post 14 were rigidly affixed to the table 4, the tool 6 would move with each rotation of the worm blank 1 from the leftward end of the worm blank 1 rightwardly a distance equal to the desired pitch of the worm thread, said pitch being uniform throughout the length of the worm. However, in the present apparatus, the post 14 is pivotally arranged with respect to the table 4 and is moved with said table, and with respect thereto, solely through the worm 17. Assuming for a moment that the worm 17 does not rotate, it will be seen that said worm, being affixed to the table 4 through the bearings 18 and 19, will lock the worm wheel 16 non-rotatably with respect to the table 4 and thus rotation of said table 4 will appear as equal angular movement of the tool 6.

However, as said table 4 rotates, the cam follower 23 moves along the cam 24 and thus imparts a slight rotation to the shaft 22 and thence to the worm 17. This is applied to the worm wheel 16 as an independent motion in addition to the uniform angular movement of the table 4. Because of the shape of the cam 24, it will be seen that the rotation of the worm 17 will commence at its maximum rate and progressively decrease to the dividing point between the sections "A" and "B" of said cam 24 and will then move in the opposite direction and progressively increase and reach a maximum at the extreme rightward end of the cam 24. These motions applied through the worm wheel 16 to the tool 6, are in such a direction that in one embodiment, the lead applied to the worm flights at the leftward portion of the worm blank is slightly increased over a selected norm, said norm being the lead extending if the angular motion of the tool 6 were identical with the angular motion of the table 4. Said increase in lead over said norm progressively diminishes from the leftward end of the worm to the dividing point between the sections "A" and "B" of the cam 24, and then said lead lags behind said norm at a progressively increasing rate to the rightward end of the worm.

Since it will be apparent that several cuts are required by the tool point 8 with respect to the worm blank 1 to form the worm, it will be appreciated that the tool point 8, as it reaches the rightward end of the worm blank, will be returned to the leftward end of the worm blank and a new cut started. This returning may be accomplished in any of several convenient and presently known ways, either by backing the tool away from the worm blank and moving it leftwardly until it is again in starting position or by providing an accelerating motion in the driving means so that the table, together with a cam follower 23, may continue to travel in a clockwise direction until both the tool point 8 and the cam follower 23 are again at the leftward ends of the worm blank 1 and cam 24, respectively, and in position for starting a second cut. For purposes of the present illustration, this latter may be assumed to be the means employed, although it will be recognized that the matter of return of the tool between cuts forms no part of the present invention and it may be carried out by any method and apparatus known to the art previous to this invention.

Bearing now in mind that the teeth of the worm wheel with which the worm is to be used are all identical with respect to each other, even though possessed of curved faces, it will be recognized that the slight variation in lead applied to the several flights of the worm will result in the worm flights contacting the face of the successive worm wheel teeth at progressively different contact lines laterally across the face of the worm wheel. Thus, in FIGURE 3, there appears a typical section taken on the line III—III of FIGURE 2 and showing the relationship of the worm flights and worm wheel teeth. The points of contact between the worm flight and the worm wheel teeth appear as shown by the points 31 to 39, inclusive. By this arrangement, in a given passage through the worm, each tooth is contacted at different lines across its face, power is transmitted at said different lines of contact, wear occurs evenly and the several objects of the invention as above set forth will be obtained.

Figure 4:
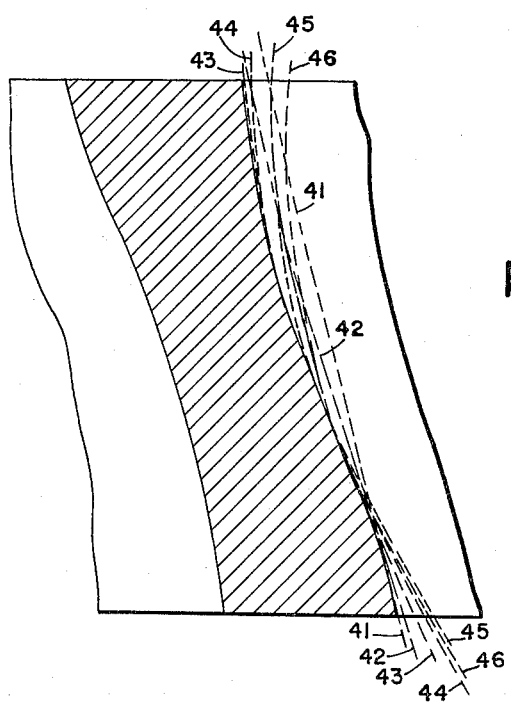
FIGURE 4 is a view similar to FIGURE 3 of a tooth on the worm wheel and showing the loci of representative cutting edges of a hob during the tooth forming operation.

In making the worm wheel, it is necessary only to utilize in place of the worm blank 1 a blank of material suitable for making a hob and then forming the hob in the same manner as above defined for forming the worm. The hob is then used in a conventional manner for cutting a suitable blank for the making of a worm wheel. The variable lead applied to the hob flights effect slightly different cuts on the worm wheel teeth, as illustrated by the broken lines 41 to 46, inclusive, in FIGURE 4 and thereby provide a smooth tooth surface in place of the ridged surface which inevitably occurs in present practice in worm wheels made with hobs having a constant lead.

We claim:

1. A method for making a worm wheel, comprising the steps: forming a hob having a generally hourglass shape wherein the root thereof is of circular cross-section and the diameter of said root varies from one end to the other so that those surface elements of said root which lie in a diametric plane through said worm comprise arcs of a circle, and providing a cutting thread arranged around said root in generally helical form wherein the lead of said thread varies in one direction from a norm in one portion of the axial length of said hob and varies in the other direction from said norm in another portion of the axial length of said hob; and rotating said hob against a gear blank for forming a worm wheel.

2. A method for making a worm wheel, including the steps of rotating a hob blank, holding a metal removing device against said blank and moving said device from one end of said blank to the other in accordance with a predetermined pattern to cut said blank to the desired shape, said moving of said device including the steps of progressively: increasing the speed of axial movement of said device slightly over a predetermined norm through about one half of the path of travel of said device along said blank and progressively decreasing the speed of axial travel of said device through the other half of said path of travel during constant speed rotation of the hob blank to form a threaded hob the lead of which progressively increases through one half thereof and progressively decreases through the other half thereof; and rotating said hob against a gear blank to form a worm wheel.

3. A method of making an hourglass-shaped object comprising the steps; rotating a blank; applying a metal removing device against said blank at one end thereof and progressively moving said device axially along said blank while said blank is rotating to form a thread thereon, said device as it moves between one end of said blank and a point near the center thereof being moved axially at a rate which progressively changes in one direction, said device as it moves between said point and the other end of said blank being moved axially at a rate which progressively changes in the opposite direction.

4. A method of making an hourglass-shaped worm comprising the steps; rotating a worm blank about a first axis at a constant speed; applying a metal removing device against said blank at one end thereof, said device being mounted for angular movement about a second axis perpendicular to said first axis; applying a first force to move said device angularly about said second axis in synchronism with the rotation of said blank; superimposing on said first force a second force variable in response to the extent of angular movement of said device so that said device is moved axially along said blank at a variable rate determined by the resultant of said first and second forces to form a thread on said blank, said second force being progressively increased as said device is moved from one end of said blank to a point near the center thereof and being progressively decreased as said device moves from said point to the other end of said blank so that the lead of the thread progressively increases between said one end of said blank and said point and progressively decreases between said point and the other end of said blank.

References Cited in the file of this patent

UNITED STATES PATENTS

| | | |
|---|---|---|
| 1,751,540 | Cone | Mar. 25, 1930 |
| 1,902,683 | Wildhaber | Mar. 21, 1933 |
| 1,903,318 | Wildhaber | Apr. 4, 1933 |
| 2,321,102 | Pelphrey | June 8, 1943 |
| 2,859,665 | Birtch et al. | Nov. 11, 1958 |